(12) United States Patent
Nakamura (10) Patent No.: US 8,766,197 B2
(45) Date of Patent: Jul. 1, 2014

(54) RADIATION DETECTION ELEMENT (75) Inventor: Hidehito Nakamura, Chiba (JP)

(73) Assignee: National Institute of Radiological Sciences, Chiba-shi (JP)

(*) Notice: Subject to any disclaimer, the term of this patent is extended or adjusted under 35 U.S.C. 154(b) by 0 days.

(21) Appl. No.: 13/513,799

(22) PCT Filed: May 6, 2010

(86) PCT No.: PCT/JP2010/057753
§ 371 (c)(1),
(2), (4) Date: Jun. 4, 2012

(87) PCT Pub. No.: WO2011/067952
PCT Pub. Date: Jun. 9, 2011

(65) Prior Publication Data
US 2012/0235046 A1 Sep. 20, 2012

(30) Foreign Application Priority Data

Dec. 4, 2009 (WO) .................. PCT/JP2009/070380

(51) Int. Cl.
G01T 1/20 (2006.01)
C09K 11/06 (2006.01)
(52) U.S. Cl.
USPC ............. 250/361 R; 252/301.16; 252/301.17
(58) Field of Classification Search
USPC ...................... 250/361 R; 252/301.16, 301.17
See application file for complete search history.

(56) References Cited

U.S. PATENT DOCUMENTS 5,606,638 A * 2/1997 Tymianski et al. ........... 385/143
2007/0205369 A1* 9/2007 Huth et al. .................... 250/368

FOREIGN PATENT DOCUMENTS

| JP | 61-008693 A | 1/1986 |
| JP | 63-129304 A | 6/1988 |
| JP | 1-168787 A | 7/1989 |

OTHER PUBLICATIONS

Goda, Kazuo et al., "Mechanism of Isothermal Luminescence for Polyethylene Terephthalate (PET) UV-Irradiated at Low Temperature", Research Bulletin of Meisei University, School of Science of Engineering, Mar. 20, 2002, pp. 37-40, No. 38; cited in ISR, w/English translation.
Nakamura, Hidehito et al., "Spectroscopy by Simple Plastic", 52nd Proceedings of the Annual Meeting of the Japan Radiation Research Society, Nov. 1, 2009, pp. 151; cited in ISR, w/English translation.
Iguchi, Tetsuo, "Recent Progress in the Development of Scintillating Fibers", Oyo Butsuri, 1994, pp. 576-583, vol. 63. No. 6; cited in ISR, w/English translation.
International Search Report of PCT/JP2010/057753, mailing date Aug. 10, 2010.
Written Opinion of PCT/JP2010/057753, mailing date Aug. 10, 2010.

* cited by examiner

Primary Examiner — David Porta
Assistant Examiner — Mindy Vu
(74) Attorney, Agent, or Firm — Westerman, Hattori, Daniels & Adrian, LLP (57) ABSTRACT

Disclosed is a radiation detection element which can inexpensively be manufactured. The detection element including, as a main component, a base resin not containing any fluorescent substance at all is used for radiation measurement.

7 Claims, 6 Drawing Sheets

RADIATION DETECTION ELEMENT

TECHNICAL FIELD

The present invention relates to radiation detection elements for radiation measurement, which are used in a wide variety of scientific fields including physical science, engineering, and medical science.

BACKGROUND ART

In general, radiation of charged particles such as alpha and beta rays, when passing through a substance, ionizes, excites, or dissociates atoms or molecules in the substance and loses energy. The energy transmitted to the substance is further emitted as thermal kinetic energy or electromagnetic waves. When the substance is, e.g., one that emits fluorescence, most of the energy is emitted as light in the visible area; and this phenomenon is referred to as scintillation and the emitted light as scintillation light.

Further, in the case of radiation carrying no electrical charge, such as gamma or neutron rays, since a similar phenomenon is also caused by secondary charged particles emitted when the radiation interacts with a substance, the radiation is detected using the scintillation phenomenon.

A photomultiplier tube is used for measuring scintillation light. The photomultiplier tube is a high sensitive photodetector added with a current amplification (=electron multiplication) function based on a phototube which converts light energy into electric energy utilizing a photoelectric effect.

Substances that causes scintillation phenomena are generally collectively called scintillators; and inorganic scintillators containing inorganic crystals typified by NaI (Tl) and organic scintillators including liquid scintillators in which fluorescent substances that emit fluorescence when radiation is incident, such as organic crystals like anthracene and terphenyl, are dissolved in organic solvents such as xylene, and plastic scintillators in which fluorescent substances are dissolved and dispersed in transparent resins such as polystyrene are used in the field of radiation measurement.

Especially, the plastic scintillators have often been used for half a century due to advantages such as their handleability and moldability into optional and large shapes.

Representative plastic scintillators are those in which first fluorescent substances such as 2,5-diphenyloxazole (DPO), 1,4-bis(5-phenyl-2-oxazole)benzene (POPOP), p-tetraphenyl (P-TP), p-quarterphenyl (P-QP) and 2-(4-biphenyl)-5-(4-tert-butylphenyl)-1,3,4-oxadiazole (B-PBD) and second fluorescent substances such as bis(O-methylstyryl)benzene (bis-MSB), 9,10-diphenylanthracene, and 9,10-dimethylanthracene are added to a styrol-based base resin such as polystyrene (PS) or polyvinyltoluene (PVT).

As longstanding common sense in the art, it has been needed to add fluorescent substances to plastic scintillators. Its principal reasons include, since the wavelengths of electromagnetic waves emitted from a base resin excited by irradiation with radiation have been reported to be as short as 150-300 nm, 1) unadaptation to the wavelength range of 300-400 nm suitable for measurement with a photomultiplier tube used for measurement and 2) the insufficient amount of light arriving at a detecting portion due to self-absorption by the base resin. In this regard, it is said that the energy of the electromagnetic waves emitted from the base resin can be converted into light of ~350 nm with a first fluorescent substance and of ~420 nm with a second fluorescent substance by adding the fluorescent substances to obtain scintillation light with wavelengths, suitable for measurement, having a high transmittance, and difficult to be self-absorbed.

Accordingly, it is common general technical knowledge in the art that addition of fluorescent substances to scintillators is essential, so that studies on the combinations of various base resins and fluorescent substances have been conducted for improving measurement technologies.

However, any attempt to use only a base resin as a radiation detection element has not been reported until now because of the common general technical knowledge that the addition of fluorescent substances to scintillators is essential, as mentioned above.

SUMMARY OF INVENTION

Technical Problem

Since the kinds and amounts of fluorescent substances added in manufacture of scintillators depend largely on the know-how of manufacturers and the number of the manufacturers is also limited, a market is almost monopolized. Therefore, scintillators are generally expensive and the prices of radiation detectors employing them are also very high. An object of the present invention is to provide a radiation detection element which can inexpensively be manufactured to enable more inexpensive radiation measurement.

Solution to Problem

In contrast to the longstanding common general technical knowledge in the field of radiation measurement, the present invention is to provide a radiation detection element comprising only a base resin not containing any fluorescent substance at all, i.e., a radiation detection element described below.

1. A radiation detection element comprising a base resin as a main component, the radiation detection element not containing any fluorescent substance.
2. The radiation detection element, wherein the base resin is a polymer with an aromatic ring.
3. The radiation detection element, wherein the polymer with an aromatic ring is a polymer selected from polystyrene, polyvinyltoluene, polyethylene terephthalate, and copolymers or mixtures thereof.
4. A radiation detection element comprising a PET bottle-recycled resin as a main component.
5. The radiation detection element comprising the PET bottle-recycled resin as the main component, the radiation detection element not containing any fluorescent substance.
6. The radiation detection element being for use in a photomultiplier with a sensible wavelength peak of 300 nm to 500 nm.
7. Use of the radiation detection element in radiation detection.
8. A radiation detector comprising an interaction portion which interacts with radiation to emit light and a detecting portion which detects light emitted from the interaction portion, the interaction portion comprising the radiation detection element.

Advantageous Effects of Invention

In accordance with the present invention, radiation can be detected by using, as a radiation detection element, a base resin which is used in a conventional plastic scintillator, without being added with a fluorescent substance.

Further, in accordance with the present invention, an excellent resolution can be obtained in comparison with a conventional plastic scintillator containing a fluorescent substance.

Furthermore, in accordance with the present invention, a more inexpensive material can be used in manufacture of a scintillator to be able to realize reduction in cost of a radiation detector.

BRIEF DESCRIPTION OF DRAWINGS

The horizontal axis represents fluorescence wavelength (nm unit) and the vertical axis represents light volume/quantum efficiency.

DESCRIPTION OF EMBODIMENTS

Base resins used in accordance with the present invention include polymers used as base resins for known plastic scintillators. As used herein, containing a base resin as a main component means that not less than 80% by weight, preferably not less than 90% by weight, further preferably not less than 95% by weight, of the base resin is preferably contained in a scintillator and does not also exclude the fact that the scintillator comprises only the base resin.

Especially, an aromatic polymer containing an aromatic ring in a main or side chain is desirable and mention is made of aromatic polyimides, aromatic polyamides, aromatic polyesters, aromatic polycarbonates, and aromatic polyethers.

For example, generally commercially available polystyrenes may be used. Aromatic polyesters such as polyvinyltoluene or the like, which is a polymer having, as a side chain, a phenyl group substituted by a lower alkyl group, and polyethylene terephthalate may also be used without limitation. Two or more of these aromatic polymers may be used together and copolymers or mixtures thereof may be used.

Furthermore, PET bottle-recycled resins produced with used PET bottles as raw materials may be used. The PET bottles as used herein are resin bottles which are used as containers for being filled with foods (such as soy sauce and dairy products), cold drinks, alcoholic beverages, and the like and mainly based on PET (polyethylene terephthalate) as a raw material, and examples of a manufacturing method therefor and composition thereof are disclosed in U.S. Pat. No. 3,733,309. PET bottles, pressure resistant PET bottles, pressure PET bottles, PET bottles for aseptic filling at ordinary temperature, and the like are used without particular limitation if they are currently circulated recyclable PET bottles. The PET bottle-recycled resins are resins produced using recycled raw materials processed in recycling steps, which are usually performed, such as washing, foreign body removal, and grinding of PET bottles, and may also contain, as needed, additives, which are usually used, such as plasticizers, stabilizers, lubricants, antistatic agents, and antioxidants, and polyethylene terephthalate that is not a recycled raw material.

As used herein, "fluorescent substance" is 2,5-diphenyloxazole (DPO), 1,4-bis(5-phenyl-2-oxazole)benzene (POPOP), p-tetraphenyl (P-TP), p-quarterphenyl (P-QP) and 2-(4-biphenyl)-5-(4-tert-butylphenyl)-1,3,4-oxadiazole (B-PBD), 2-(4-tert-butylphenyl)-2-(4-biphenyl)-1,3,4-oxadiazole (butyl PBD) or bis(O-methylstyryl)benzene (bis-MSB), 9,10-diphenylanthracene, 9,10-dimethylanthracene, or the like, or a fluorescent substance such as 4,4'-bis-(2,5-dimethylstyryl)biphenyl (BDB), a fluorescent molecule, or a molecule collectively called a scintillation material.

As used herein, "not containing any fluorescent substance" means that any molecules as described above are not contained even in the state of isolation or bond (including covalent bond, ionic bond, and the like) to a base resin.

(Shape of Material)

In accordance with the present invention, examples of the shape of the radiation sensing element include, but are not particularly limited to, rectangular parallelepipeds of around 5×5×10 mm, columns, and the like. The shape may also further be enlarged in the range in which optical distortion which causes a problem when detection is performed in a detecting portion is not generated or in the range in which loss in light volume does not occur.

(Working of Material)

In an embodiment of the present invention, light generated in the base resin of the interaction portion may also effectively be led to the detecting portion to perform working for improving measurement efficiency. For example, the surface of the detection element may also be polished for the purpose of utilizing internal total reflection to perform specular working. At least one or more worked surfaces are desirable. Working for disposing a light reflection layer on the surface of the detection element may also be performed.

As the reflection layer, for example, aluminum, Teflon®, or the like is desirable, without particular limitation if light generated in the base resin can be reflected.

(Kind of Radiation Detector)

The radiation detector which can measure radiation using the present invention includes the interaction portion which interacts with radiation to emit light and the detecting portion which detects the emitted light. A photomultiplier or a semiconductor detector may be used as a light-emitting portion. For example, photomultiplier tubes R8900-00-M16, H5773, H6780, H7195, H7732, H9305, and the like, manufactured by Hamamatsu Photonics K.K., can be used without limitation. When a polyvinyltoluene resin, a PET bottle-recycled resin, or the like is used as the base resin, it is preferable to use a photomultiplier with a sensible wavelength peak of 300 nm to 500 nm, more preferably 300 to 400 nm.

It is also possible to used an ultraviolet sensor (semiconductor detector) produced based on zinc oxide (ZnO) single crystals having high sensitivity to ultraviolet rays of 380 nm or less.

The interaction portion includes the above-mentioned radiation detection element according to the present invention.

The radiation detector according to the present invention may have any shape and structure if including the interaction portion and the detecting portion as described above.

(Measurable Kind of Ray)

In accordance with the present invention, spectrometry of various radiations (beta rays, gamma rays, internal conversion electrons, and the like) is possible since fluorescence in the short wavelength region from the base resin can sufficiently be detected.

EXAMPLES

Examples of radiation measurement using the radiation detection element comprising the base resin added with no fluorescent substance in accordance with the present invention will be described below.

Example 1

Measurement of Radiation Source

A detection element having a size of 62 mm×62 mm×10 mm comprising polyvinyltoluene (PVT) having a purity of 100% was made. In order to efficiently detect fluorescence from the detection element, a photomultiplier tube (model number: H7195, Hamamatsu Photonics) was placed on each of the four sides of 62 mm×10 mm of the detection element. The upper and lower surfaces of 62 mm×62 mm of the detection element were subjected to specular working In order to reduce accidental events due to energy emitted from radiation sources and different radiations, a lead collimator (size of 30 mm×30 mm×8 mm, a hole having a diameter of 10 mm in a center) was used to be placed on the center of the detection element. For the radiation sources, a $^{207}$Bi radiation source and a $^{137}$Cs radiation source purchased from the Japan Radioisotope Association were used.

A method for analyzing measurement data was performed based on H. Nakamura, et. al., Rad. Res. 170, 811 (2008). Specifically, calibration to separate an error component from an energy distribution by actual measurement with a radiation meter was performed paying attention to the fact that an error actually occurred when a measurement value was conventionally calibrated assuming that an actual measurement value, in which energy was lost due to a radiation source per se and a protective film therearound, and a theoretical value were equal.

This method is particularly effective in measurement with a radiation source that emits a plurality of radiations since an energy resolution in a radiation meter is significantly improved.

(Performance Assessment Using $^{207}$Bi Radiation Source)

From the $^{207}$Bi radiation source, 11 radiations in total, three gamma rays having different energies and eight internal conversion electrons having different energies (two sets of internal conversion electrons from the K shell and the L1, L2, and L3 shells), are mainly emitted from the radiation source.

Figure 1:
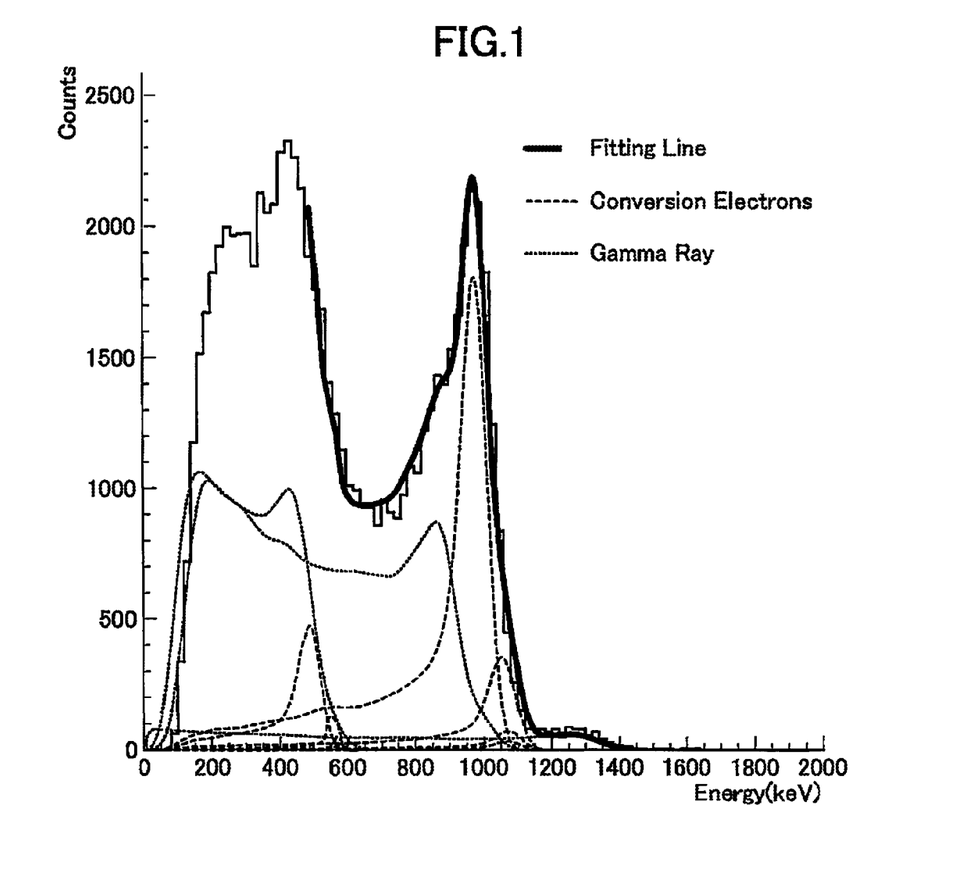
FIG. 1 indicates the composite energy distribution of a radiation group (11 rays) emitted from a $^{207}$Bi radiation source. Three gamma rays with different magnitudes of energy (569.7 keV, 1063.6 keV, and 1770.2 keV) and eight internal conversion electrons (975.6 keV from K shell, 1047.8 keV from L1 shell, 1048.4 keV from L2 shell, 1050.6 keV from L3 shell, 481.6 keV from K shell, 553.8 keV from L1 shell, 554.5 keV from L2 shell, and 556.6 keV from L3 shell) are indicated.
Figure 2:
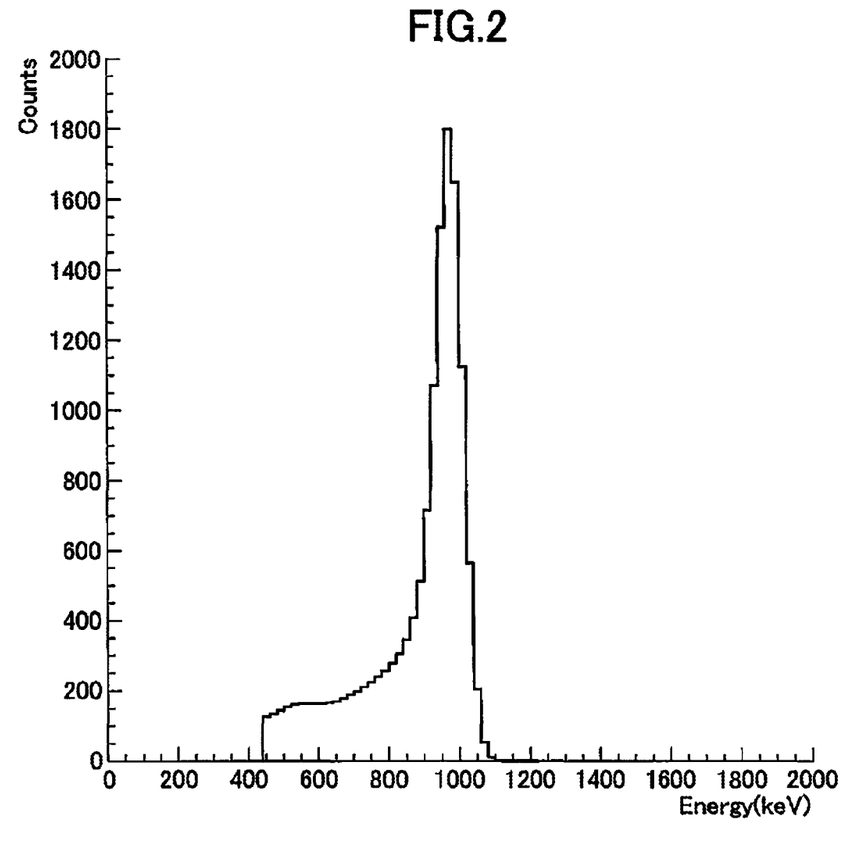
FIG. 2 indicates the energy distribution of only 976 keV K-shell internal conversion electrons emitted from the $^{207}$Bi radiation source. The asymmetrical energy distribution due to energy loss in the radiation source is indicated.

The energy spectra obtained by the detection element are indicated in FIG. 1 and the results of extraction of only the K-shell internal conversion electrons from the energy spectra are indicated in FIG. 2.

The reason why the K-shell internal conversion electrons having a theoretical single energy of 976 KeV does not indicates a symmetrical normal distribution but indicates an asymmetrical energy distribution is because of loss in energy in the radiation source.

The energy resolution of the detection element indicated from the measurement results was found to be σ=3.58±0.02% based on the region of 976 KeV. The higher performance than the result of σ=3.7-4.1% using a usual plastic scintillator was indicated.

(Performance Assessment Using $^{137}$Cs Radiation Source)

Figure 3:
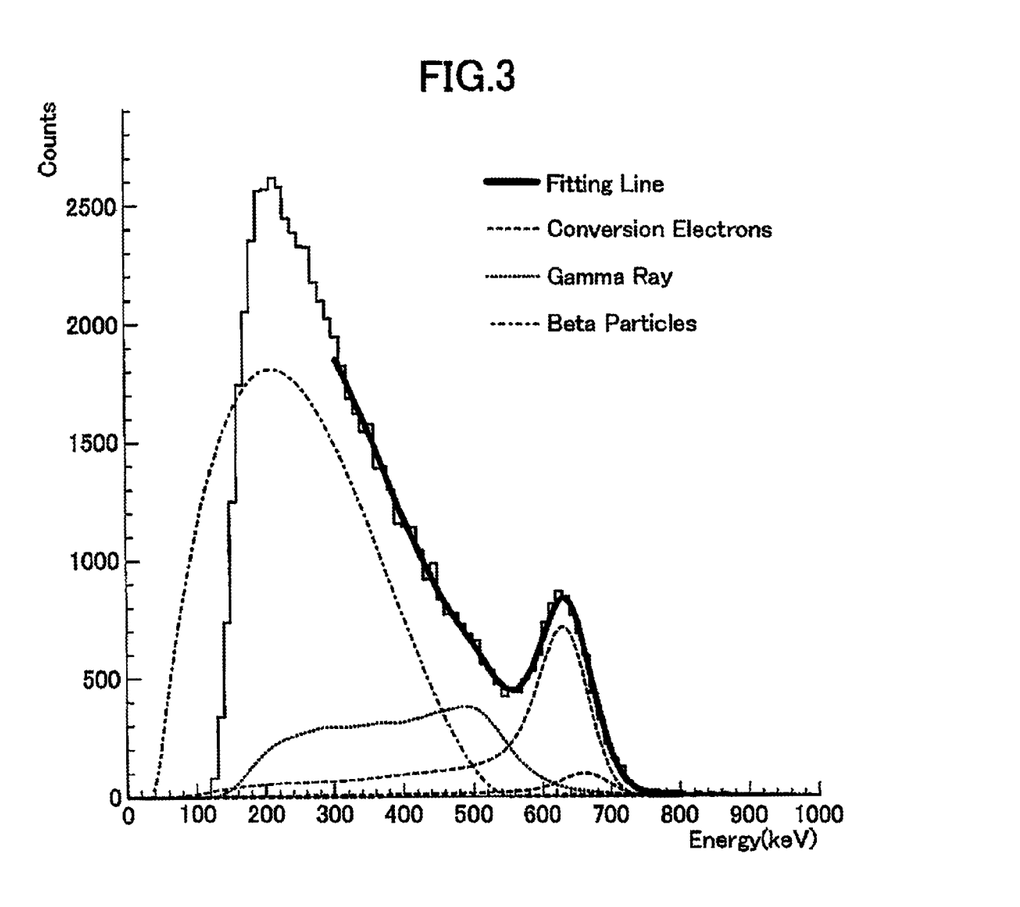
FIG. 3 indicates the composite energy distribution of a radiation group (6 rays in total) emitted from a $^{137}$Cs radiation source. One gamma ray, one beta ray, and four internal conversion electrons with different magnitudes of energy (625.6 keV from k shell, 655.9 keV from L1 shell, 656.3 keV from L2 shell, and 656.6 keV from L3 shell) are separated.
Figure 4:
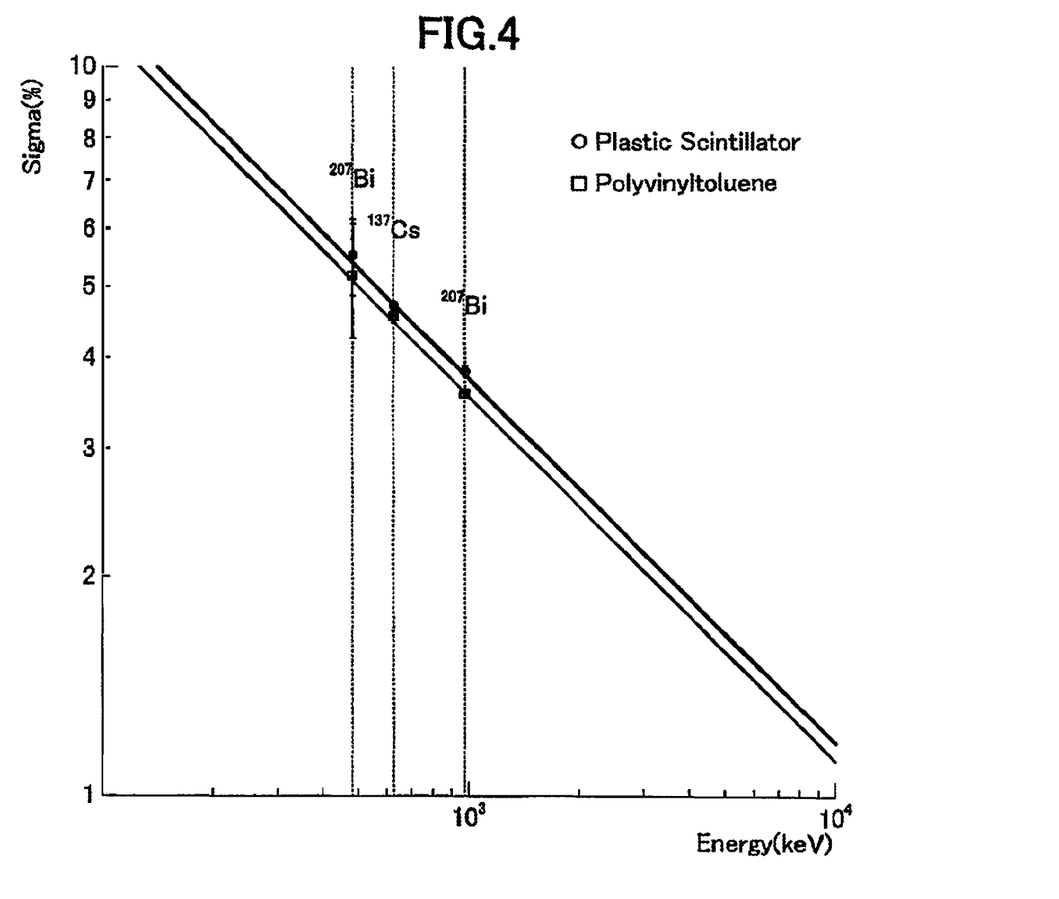
FIG. 4 indicates a comparison between the energy resolutions of a base resin (polyvinyltoluene) not containing any fluorescent substance and a plastic scintillator (model number: BC-408, manufactured by Saint-Gobain Corporation) containing a conventional fluorescent substance. The data indicate 976 keV and 482 keV K-shell internal conversion electrons from the $^{207}$Bi radiation source and a 626 keV K-shell internal conversion electron from the $^{137}$Cs radiation source.

From the $^{137}$Cs radiation source, six radiations in total, gamma and beta rays and four internal conversion electrons having different energies (one set of internal conversion electrons from the K shell and the L1, L2, and L3 shells), are mainly emitted. The energy spectra are indicated in FIG. 3. As a result of the measurement by the detection element, the energy resolution was found to be σ=4.57±0.01 based on the region of 625 KeV, as indicated in FIG. 4.

(Summary of Results of Radiation Sources)

Summarization of the results of the energy resolutions obtained from the $^{207}$Bi radiation source and the $^{137}$Cs radiation source indicated σ=3.5/E (MeV)$^{1/2}$% in polyvinyltoluene having a purity of 100%, which was a better value than the result of σ=3.7/E (MeV)$^{1/2}$% obtained when the same experiment and analysis were performed in a plastic scintillator (manufactured by Saint-Gobain crystals Corporation, BC408) having the same size. The results are indicated in FIG. 4.

Specifically, it was indicated that radiations can sufficiently be detected by a detection element comprising only a base resin not containing any fluorescent substance instead of a conventional plastic scintillator containing a fluorescent substance and a better resolution than that in the plastic scintillator is indicated.

Further, it was demonstrated that, even when a photomultiplier tube having usual specifications is used, fluorescence in the short wavelength region from a detection element can sufficiently be detected and spectrometry of various radiations (beta rays, gamma rays, internal conversion electrons, and the like) is possible. Furthermore, it was indicated that further high sensitivity measurement was enabled by using a detecting portion such as a photomultiplier tube having high sensitivity to the short wavelength region.

Example 2

Assessment of Possibility of Radiation Measurement Using PET Bottle-Recycled Resin (Performance Assessment Using $^{207}$Bi Radiation Source)

Figure 5:
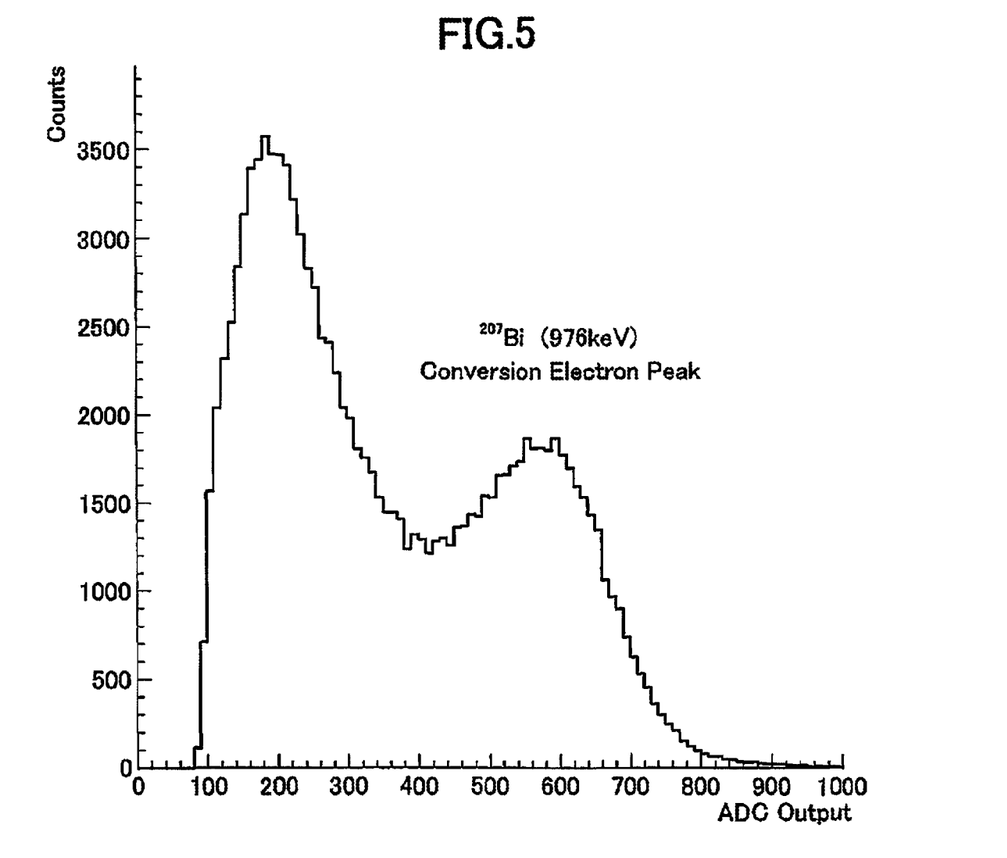
FIG. 5 indicates the composite energy distribution of a radiation group (11 rays) emitted from the $^{207}$Bi radiation source. As is clear from comparison with FIG. 1, the peak indicates a 976 keV K-shell internal conversion electron.

Next, an example of using a detection element comprising a base resin not containing any fluorescent substance but containing impurities will be indicated. A block made of a PET bottle-recycled resin employing a PET bottle made in Japan (hereinafter referred to as recycled PET resin) was used to examine whether or not radiation can be measured. Since this block had a complicated shape (step-like shape; external dimension of a part used for detection of 50 mm×110 mm×5 mm) and was not subjected to surface working for measurement, only one photomultiplier tube (model number: H7195, manufactured by Hamamatsu Photonics K.K.) was placed on a bottom face (face of 50 mm×110 mm) and light excited by radiation incident from an opposite face using a $^{207}$Bi radiation source was measured. As a result, the peak of the 976 keV K-shell internal conversion electron was able to be sufficiently observed similarly to the case of polyvinyltoluene, as indicated in FIG. 5.

This revealed that a base resin not having a purity of 100% could be used as a radiation detection element and sufficient radiation measurement could be performed even in the state of performing no further special working.

The characteristics of the PVT and recycled PET resins of Examples 1 and 2 are listed in the following table.

TABLE

| Substance | PVT resin with purity of 100% | Conventional plastic scintillator (BC-408) | Recycled PET resin |
|---|---|---|---|
| Manufacturer | Saint-Gobain | Saint-Gobain | Mitsui Chemicals, Inc. |
| Resin composition | $(C_9H_{10})_n$ | $(C_9H_{10})_n$ | $(C_{10}H_8O_4)_n$ |
| Refraction index | 1.58 | 1.58 | 1.64 |
| Maximum emission wavelength | 330 nm | 425 nm | 380 nm |

(Emission Spectra from Polyvinyltoluene Resin and PET Bottle-Recycled Resin)

Figure 6:
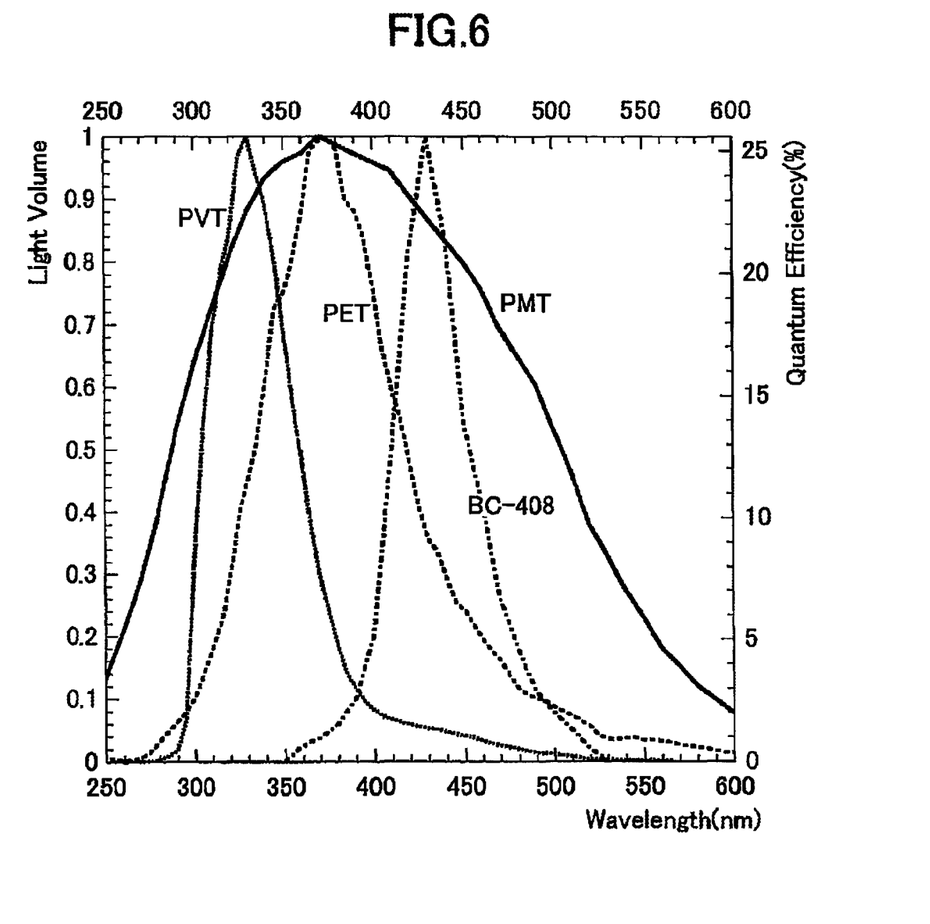
FIG. 6 indicates emission spectra from a polyvinyltoluene resin, a PET bottle-recycled resin, and a conventional plastic scintillator (BC-408).

The emission spectra of fluorescence from the polyvinyltoluene resin of Example 1 and the PET bottle-recycled resin using the PET bottle of Example 2 were measured with a Hitachi fluorescence spectrophotometer (model F-2700). Further, a scattering peak removal filter (manufactured by Hitachi High-Technologies Corporation) was inserted into the Hitachi fluorescence spectrophotometer to eliminate the influences of scattering peaks by the resins per se. Light of 330 nm was made to be incident on the PET bottle-recycled resin to measure fluorescence emitted from the PET bottle-recycled resin. In FIG. 6, the emission spectrum of the fluorescence emitted from the PET bottle-recycled resin of Example 2 is represented by a dashed line, the emission spectrum from polyvinyltoluene having a purity of 100% used in Example 1 by a dotted line, and the emission spectrum from the conventional plastic scintillator (BC-408) by an alternate long and short dash line.

The fluorescence peaks of 330 nm and 380 nm of the polyvinyltoluene resin and the PET bottle-recycled resin are almost consistent with the peak of the sensible wavelength of the photomultiplier tube represented by the line. Specifically, it was indicated that the polyvinyltoluene resin and the PET bottle-recycled resin emit light having a wavelength with the highest sensitivity of the photomultiplier tube and are extremely suitable for radiation measurement.

The wavelength regions of the emission spectra of fluorescence emitted from the polyvinyltoluene resin and the PET bottle-recycled resin are found to be in regions similar to that of the conventional plastic scintillator, for example, a plastic scintillator manufactured by Saint-Gobain crystals Corporation (model number: BC-418, BC-420, or the like) (indicating a luminescence peak of 355 nm to 500 nm. See a product data sheet from Saint-Gobain crystals Corporation. Reference URL: http://www.detectors.saint-gobain.com/uploaded-Files/SGdetectors/Documents/Product_Data_Sheets/BC418-420-422-Data-Sheet.pdf).

Thus, it was indicated that the fluorescence emitted from the polyvinyltoluene resin and the PET bottle-recycled resin emits light in a wavelength region similar to that of the conventional plastic scintillator and the polyvinyltoluene resin and the PET bottle-recycled resin can be used for the radiation detection element even when a conventional photomultiplier tube which cannot detect light in the short wavelength region of less than 300 nm similarly with the case of the conventional plastic scintillator.

The invention claimed is:

1. A radiation detection element comprising a base resin as a main component, the radiation detection element not comprising any fluorescent substance.

2. The radiation detection element according to claim 1, wherein the base resin is a polymer with an aromatic ring.

3. The radiation detection element according to claim 2, wherein the polymer with an aromatic ring is a polymer selected from polystyrene, polyvinyltoluene, polyethylene terephthalate, and copolymers or mixtures thereof.

4. A radiation detector comprising an interaction portion which interacts with radiation to emit light and a detecting portion which detects light emitted from the interaction portion, the interaction portion comprising the radiation detection element according to claim 1.

5. The radiation detector according to claim 4, wherein said detecting portion is a photomultiplier with a sensible wavelength peak of 300 nm to 500 nm.

6. The radiation detection element according to claim 1, wherein at least one surface of the radiation detection element is polished.

7. The radiation detection element according to claim 1, further comprising a reflection layer on a surface of the radiation detection element.

* * * * *